(12) United States Patent
Kim et al.

(10) Patent No.: US 8,185,742 B2
(45) Date of Patent: May 22, 2012

(54) DEVICE AND METHOD FOR PROVIDING VIDEO STREAM HAVING INTEGRITY

(75) Inventors: Hyoung-shick Kim, Seodaemun-gu (KR); Kyung-mo Park, Gangnam-gu (KR); Myung-soo Chang, Guro-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1337 days.

(21) Appl. No.: 11/727,083

(22) Filed: Mar. 23, 2007

(65) Prior Publication Data

US 2008/0037783 A1    Feb. 14, 2008

(30) Foreign Application Priority Data

Jun. 29, 2006  (KR) .................. 10-2006-0059616

(51) Int. Cl.
*H04L 29/06*  (2006.01)
(52) U.S. Cl. ........ 713/176; 713/168; 713/180; 380/210; 380/211; 380/212; 380/30; 380/241; 380/217; 375/240.01; 375/E7.004; 375/E7.011; 375/E7.012; 375/E7.013; 375/E7.026; 375/E7.078; 375/E7.076; 375/E7.274; 375/E7.191
(58) Field of Classification Search .......... 380/278–383, 380/210, 212, 216–217, 269, 28, 241; 725/31, 725/32, 113; 713/189–193, 168, 176, 180
See application file for complete search history.

(56) References Cited

U.S. PATENT DOCUMENTS

| | | | |
|---|---|---|---|
| 5,805,700 A * | 9/1998 | Nardone et al. | 380/217 |
| 6,490,680 B1 * | 12/2002 | Scheidt et al. | 713/166 |
| 7,117,365 B1 * | 10/2006 | Rump et al. | 713/176 |
| 7,477,749 B2 * | 1/2009 | Pippuri | 380/284 |
| 2004/0196972 A1 | 10/2004 | Zhu et al. | |
| 2004/0196975 A1 | 10/2004 | Zhu et al. | |

(Continued)

FOREIGN PATENT DOCUMENTS

CN          1497577 A        5/2004

(Continued)

OTHER PUBLICATIONS

Ashutosh, A Fast Selective Video Encryption Using Alternate Frequency Transform, Feb. 2011, International Journal of Innovative Technology & Creative Engineering, vol. 1 No. 2.*

*Primary Examiner* — Taghi Arani
*Assistant Examiner* — Josnel Jeudy
(74) *Attorney, Agent, or Firm* — Sughrue Mion, PLLC (57) ABSTRACT

Provided are a device and method for providing a video stream, in which a hash value of a frame is included in the header of a video stream, and authentication information about the header is inserted into the video stream, thus ensuring integrity against the forgery of the video stream. The device includes a base frame encoding unit which encodes a base frame, an enhancement frame encoding unit which encodes an enhancement frame, a frame encryption unit which encrypts the encoded base frame and the encoded enhancement frame, a hash processing unit which calculates hash values for the encrypted base frame and the encrypted enhancement frame and hash values included in headers of previous and subsequent video streams, a header management unit which includes information about the encoded base frame and the encoded enhancement frame and the calculated hash values, in a header, and manages the header, and an authentication information creation unit which creates authentication information about the header.

19 Claims, 8 Drawing Sheets

U.S. PATENT DOCUMENTS

| | | | |
|---|---|---|---|
| 2004/0259529 A1* | 12/2004 | Suzuki | 455/411 |
| 2005/0097361 A1 | 5/2005 | Apostolopoulos et al. | |
| 2005/0180563 A1 | 8/2005 | Apostolopoulos et al. | |
| 2005/0276416 A1 | 12/2005 | Zhu et al. | |
| 2005/0281404 A1 | 12/2005 | Yu | |
| 2007/0140358 A1* | 6/2007 | Schwartz et al. | 375/240.26 |

FOREIGN PATENT DOCUMENTS

| | | |
|---|---|---|
| CN | 1535015 A | 10/2004 |
| EP | 1465426 A1 | 10/2004 |
| EP | 1465427 A1 | 10/2004 |
| JP | 2004-310097 A | 11/2004 |
| JP | 2004-312740 A | 11/2004 |
| KR | 1999-0053174 A | 7/1999 |
| KR | 10-2004-0088365 A | 10/2004 |
| KR | 10-2006-0055622 A | 5/2006 |
| WO | 2005/081534 A1 | 9/2005 |

* cited by examiner

FIG. 8 ured content E' to the sink
DEVICE AND METHOD FOR PROVIDING VIDEO STREAM HAVING INTEGRITY

CROSS-REFERENCE TO RELATED APPLICATION

This application claims priority from Korean Patent Application No. 10-2006-0059616 filed on Jun. 29, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to providing a video stream having integrity and, more particularly, to including the hash value of a frame in the header of a video stream and inserting authentication information about the header into the video stream, thus ensuring the integrity of the video stream from forgery.

2. Description of the Related Art

With the variety of network environments, a streaming system must be designed to provide streaming services for voice and video data in consideration of the bandwidth of a network, which dynamically varies, in addition to a plurality of different devices. Therefore, in general, a third module, other than the transmission module and the reception module of the streaming system, transcodes streaming data in consideration of the conditions of a streaming data reception device and a network, in order to sufficiently utilize device resources and network resources.

When a streaming service for commercial content is provided, a security means, such as encryption, is used to prevent malicious users from accessing the streaming service, and thus it is not easy to use a conventional transcoding method.

Recently conducted research into technology for streaming encrypted content, which requires transcoding, can be classified into a first method of decoding and transcoding encrypted stream content using a transcoder, and then re-encrypting the transcoded stream content, and a second method using scalable coding, and can be described based on those methods.

However, the first method has a significant problem in that decoded content may be leaked, and the second method, which uses scalable coding, can guarantee high stability in that decoding and re-encryption are not required, but has a problem in that it cannot guarantee the integrity of content against forgery.

Hereinafter, a process of performing decoding/re-encryption on content to be protected using a transcoder and a process of performing transcoding using scalable coding are described.

In the case of the process of performing decoding/re-encryption of content to be protected using conventional transcoder, a system for performing the process includes a source device A for transmitting content, a sink device B for receiving content in order to use the content, and a transcoder T for converting streaming data transmitted from the source device A into streaming data suitable for the sink device B.

First, if the source device A encodes content and transmits the encoded content to the transcoder T, the transcoder T encrypts the encoded content C using a decodable method.

Next, the source device A transmits encrypted content E to the transcoder T. Then, the transcoder T decodes the encrypted content E, and thus acquires the encoded content C.

Next, the transcoder T applies transcoding to the content C, which has been acquired through decoding, converts the content C into content C', and re-encrypts the content C' to allow only the sink device B to decode the encrypted content. Next, the transcoder T transmits encrypted content E' to the sink device B.

In the case of the process of performing transcoding using conventional scalable coding, the source device A initially encodes content using a scalable coding technique. Next, the source device A includes information about encoding in a header, divides the encoded content into layers through progressive encryption, and encrypts the encoded content respectively for each layer.

Next, the source device A transmits both encoded content E and encoding information (a truncation point) to the transcoder T. Then, the transcoder T deletes arbitrary encrypted packets without decoding the encrypted content E using the encoding information, thus transcoding encrypted content.

Next, the transcoder T transmits transcoded content E' to the sink device B.

However, the above processes do not consider the integrity of content, and have several other disadvantages.

That is, in the case of the process for performing decoding/re-encryption of content, the security of a transcoder must be guaranteed from the standpoint that the transcoder must decode and re-encrypt encrypted content.

Further, in the case of the process for performing transcoding using scalable coding, the security of the transcoder does not need to be guaranteed from the standpoint that encrypted content is not decoded, but there is a problem in that the technology provides only hiding of content, but cannot guarantee the integrity of content.

Accordingly, the integrity of content may be attacked through the revision of an unencrypted header, the insertion of false frame information, a malicious attack to delete a Group of Pictures (GOP), etc.

For example, if a header is not encrypted, a malicious attacker can revise truncation-related information included in the header, thus enabling the transcoder to perform undesirable transcoding (that is, the revision of an unencrypted header).

Further, a malicious transcoder or another malicious attacker can insert arbitrary false frame information instead of an encrypted content frame. However, because the sink device cannot distinguish encrypted content frame from false frames, such an attack cannot be prevented (that is, the insertion of false frames).

Further, a malicious attacker can delete an arbitrary GOP from encrypted content. However, since the sink device cannot be aware that the arbitrary GOP is deleted, such an attack cannot be prevented (that is, a malicious attack to delete a GOP).

Therefore, a method of guaranteeing the integrity of content against forgery, without requiring decoding and re-encryption, is needed.

Korean Patent Laid-Open Publication No. 1999-053174 (entitled a "Method of Determining the Integrity of Information Using a Hash Function") discloses a method of determining the integrity of information using a hash function, which creates an additional message from an input message and processes the additional message to eliminate simplicity when applying a hash function to a message, causes functions used in operations at respective steps to satisfy properties required for strong encryption, and utilizes a message-dependent rotation, which is dependent upon an input message, for a rotation operation, thus improving safety. However, such a method does not disclose information, for providing previous and subsequent correlations between frames (that is, a hash value), in a header.

SUMMARY OF THE INVENTION

The present invention provides a device and method which includes a hash value for an encrypted frame and hash values for providing correlations between the encrypted frame and frames previous and subsequent thereto, in the header of a video stream, thereby ensuring the integrity of frames.

The present invention also provides a device and method for inserting authentication information about the header of a video stream into the video stream, thereby ensuring the integrity of the header.

According to an aspect of the present invention, there is provided a device for providing a video stream having integrity, the device including a base frame encoding unit encoding a base frame, an enhancement frame encoding unit encoding an enhancement frame, a frame encryption unit encrypting the encoded base frame and the encoded enhancement frame, a hash processing unit calculating hash values for the encrypted frames and hash values included in headers of previous and subsequent video streams, a header management unit including information about the encoded base frame and the encoded enhancement frame and the calculated hash values, in a header, and managing the header, and an authentication information creation unit creating authentication information about the header.

According to another aspect of the present invention, there is provided a device for providing a video stream having integrity, the device including a reception unit receiving at least one encrypted frame, a header and authentication information about the header, which have been transmitted from a source device, an authentication information processing unit checking integrity of the received header using the received authentication information about the header, and a transcoding unit transcoding the encrypted frame based on information included in the header if integrity of the header has been verified as a result of the checking.

According to a further aspect of the present invention, there is provided a device for providing a video stream having integrity, the device including a reception unit receiving at least one transcoded frame, a header and authentication information about the header, which have been transmitted from a transcoder, an authentication information processing unit checking integrity of the received header using the received authentication information about the header, a hash processing unit examining whether the received frame has been forged based on a hash value included in the header if integrity of the header has been verified, and a decoding unit decoding the received frame if the frame is found not to have been forged as a result of the examination.

BRIEF DESCRIPTION OF THE DRAWINGS

The above and other aspects of the present invention will be more clearly understood from the following detailed description of exemplary embodiments taken in conjunction with the accompanying drawings, in which.

DESCRIPTION OF THE EXEMPLARY EMBODIMENTS

The advantages and characteristics of the present invention and methods of achieving them will be apparent with reference to embodiments described in detail in conjunction with the accompanying drawings. However, the present invention is not limited to the embodiments that will be disclosed below, but may be implemented in various forms. The embodiments are provided to complete the disclosure of the present invention and to inform those skilled in the art of the details of the present invention. The present invention is defined only by the scope of the accompanying claims. Hereinafter, reference now should be made to the drawings, in which the same reference numerals are used throughout the different drawings to designate the same or similar components.

Hereinafter, embodiments of the present invention will be described in detail with reference to the attached drawings.

Figure 1A:
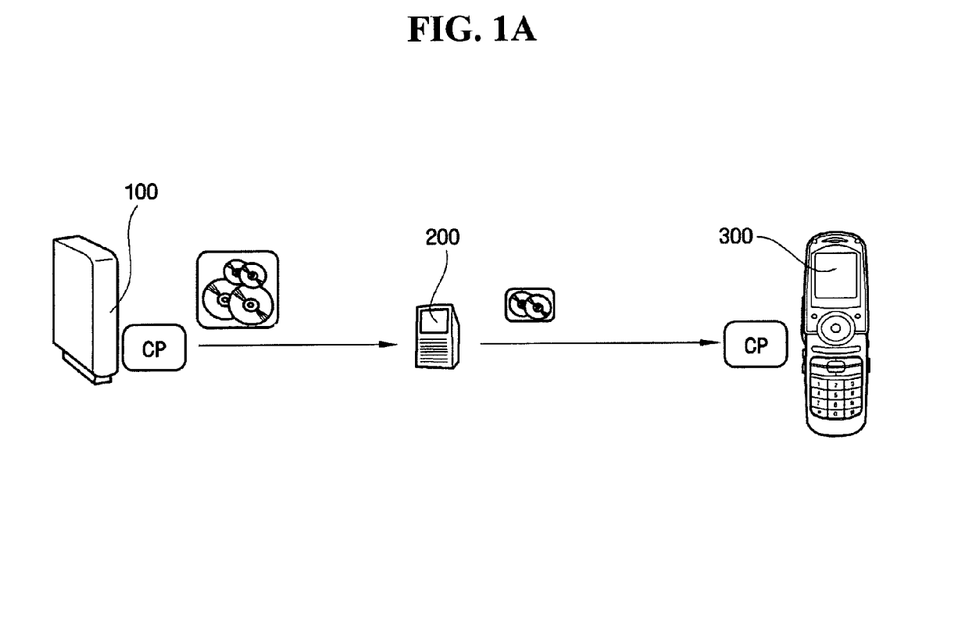
FIG. 1A is a diagram showing a system for providing a video stream having integrity according to an exemplary embodiment of the present invention.
Figure 1B:
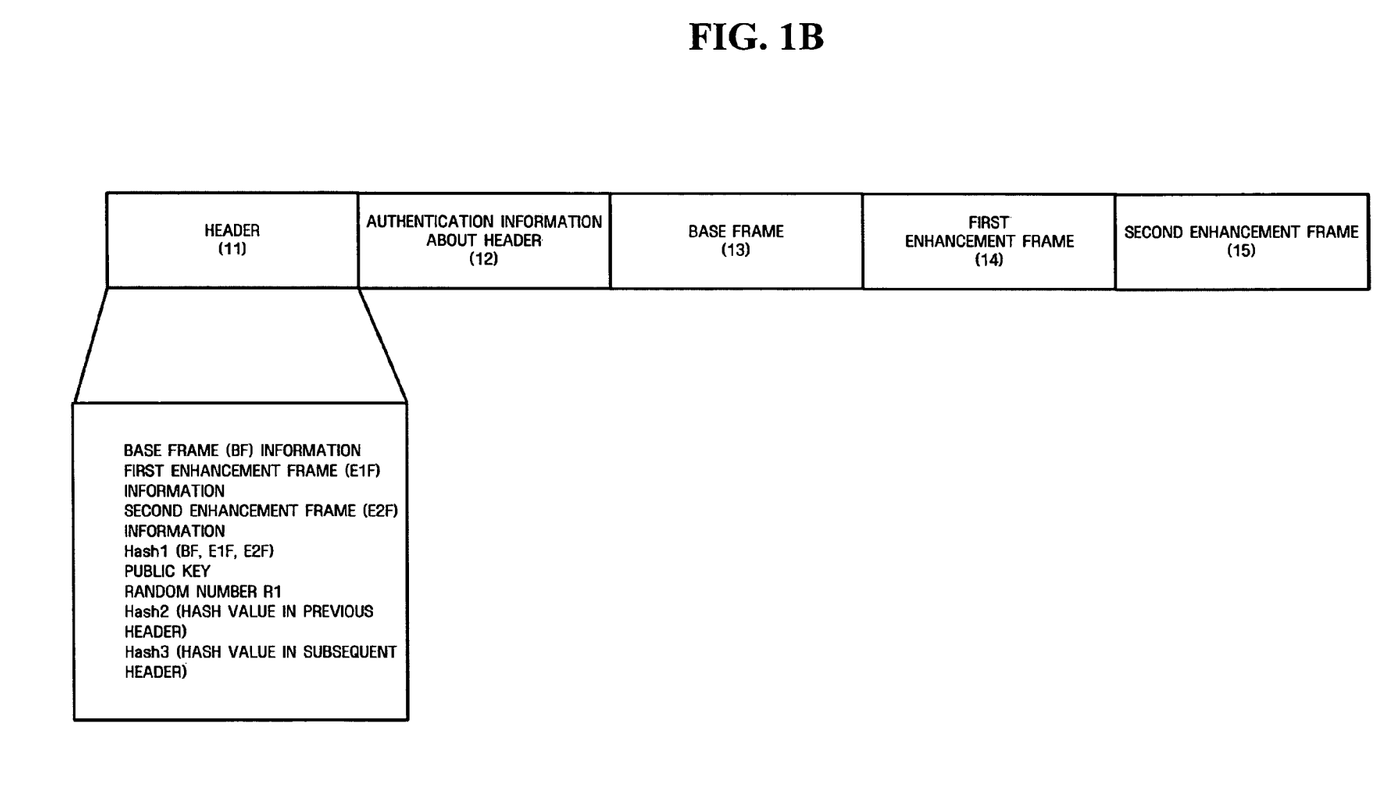
FIG. 1B is a diagram showing a video stream transmitted from the system for providing a video stream having integrity according to an exemplary embodiment of the present invention.

FIG. 1A is a diagram showing a system for providing a video stream having integrity according to an exemplary embodiment of the present invention, and FIG. 1B is a diagram showing a video stream according to an exemplary embodiment of the present invention.

As shown in FIG. 1A, the system for providing a video stream having integrity includes a source device 100, a transcoder 200 and a sink device 300.

The source device 100 transmits a predetermined video stream. As shown in FIG. 1B, the video stream includes a header 11, authentication information about the header 12 (for example, a digital signature, a message authentication code, etc.), a base frame 13 and enhancement frames 14 and 15. One or more enhancement frames can be provided in the video stream.

Further, hash values for the base frame 13 and the enhancement frames 14 and 15, a hash value ($Hash_2$) for the frame of a previous video stream, and a hash value ($Hash_3$) for the frame of a subsequent video stream are included in the header 11. In this case, the hash values for the base frame 13 and the enhancement frames 14 and 15 are included so as to determine whether the corresponding frames have been forged. The hash values ($Hash_2$ and $Hash_3$) for the frames of the previous and subsequent video streams indicate information about the correlation between a current frame and a previous frame and between the current frame and a subsequent, and are calculated using the hash values stored in the header 11. Accordingly, whether a certain frame has been deleted can be determined based on whether a forged frame has been inserted, and the correlations between a current frame and previous and subsequent frames.

Further, an arbitrary random number $R_1$ is included in the header 11 to calculate hash values for the frames of previous and subsequent video streams. When authentication information indicates a digital signature, a public key required to decode the digital signature is included in the header 11.

Further, the base frame 13 is the video frame having the lowest quality, and video data required to represent quality, that increases as the level of the layer of the enhancement frames increases, is provided. The source device 100 will be described in detail later herein, with reference to FIG. 2.

The transcoder 200 receives the encrypted frames, the header, and authentication information about the header from the source device 100, determines the integrity of the header using the received authentication information, and then performs transcoding. The transcoder 200 will be described in detail later herein, with reference to FIG. 3.

The sink device 300 decodes transcoded frames, and then uses the transcoded frames. In this case, the sink device 300 checks the integrity of the received header and frames. As a result of the checking, if the header and the frames are found not to have been forged, the sink device 300 decodes the corresponding frames. The sink device 300 will be described in detail later herein, with reference to FIG. 4.

Figure 2:
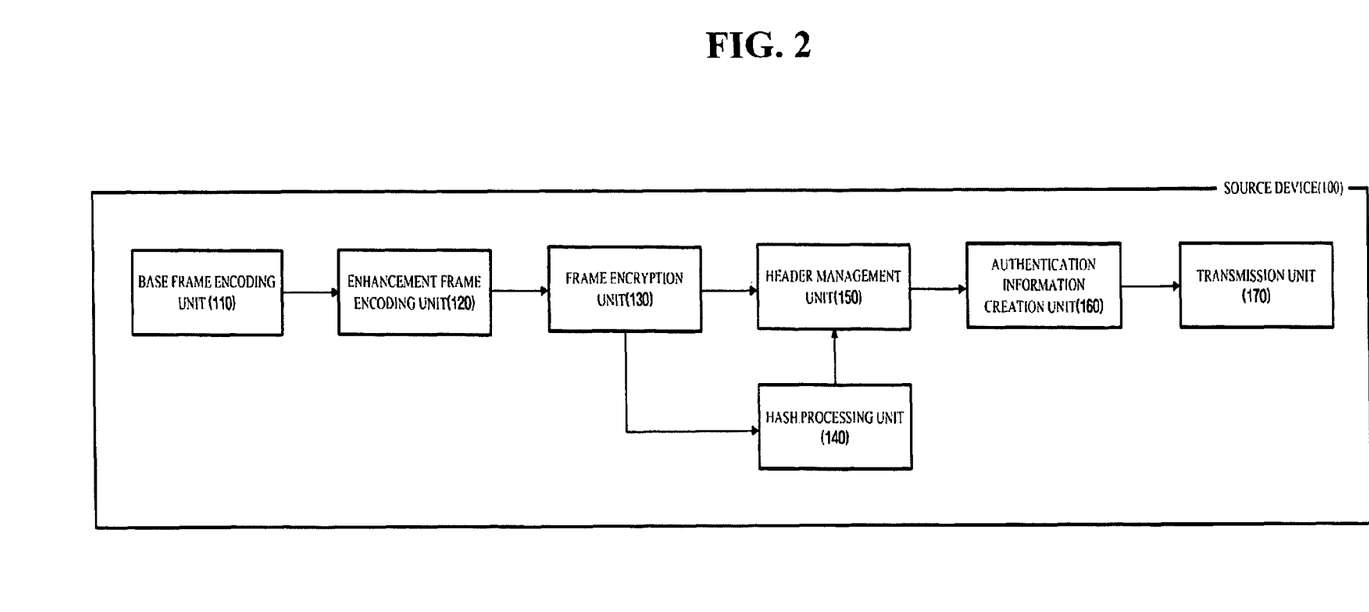
FIG. 2 is a block diagram of a source device in the system for providing a video stream having integrity according to an exemplary embodiment of the present invention.

FIG. 2 is a block diagram of the source device in the system for providing a video stream having integrity according to an exemplary embodiment of the present invention.

As shown in FIG. 2, the source device 100 includes a base frame encoding unit 110, an enhancement frame encoding unit 120, a frame encryption unit 130, a hash processing unit 140, a header management unit 150, an authentication information creation unit 160, and a transmission unit 170.

The term 'unit', as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and may be configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or may be further separated into additional components and units.

The base frame encoding unit 110 encodes a base frame composed of video data having the lowest quality. The base frame encoding unit 110 encodes the frame using a scalable coding technique.

The enhancement frame encoding unit 120 encodes an enhancement frame composed of video data having higher quality than the base frame. The enhancement frame encoding unit 110 encodes the frame using a scalable coding technique. Further, the enhancement frame includes only data corresponding to the difference between the video data of the base frame having low quality and video data having high quality when the video data of the base frame having low quality is mapped to the video data having high quality. Data required to represent quality, that increases as the level of the layer of the enhancement frames increases, is provided.

The frame encryption unit 130 encrypts the encoded frames. In this case, encryption is performed with respect to each layer using progressive encryption.

The hash processing unit 140 calculates hash values for certain frames, which have been encrypted by the frame encryption unit 130. The hash processing unit 140 also calculates hash values for the frames of previous and subsequent video streams using hash values included in the headers of the previous and subsequent video streams, in addition to the hash value for the frame of a video stream to be currently transmitted. In this case, the calculation of the hash values for the frames is required to check the integrity of a corresponding frame and correlations between a current video stream and previous and subsequent video streams.

For example, a hash value for an i-th encrypted frame in a video stream to be transmitted (for example, a base frame and an enhancement frame) is calculated using the hash function $H_i = Hash_1$ (Frames).

Next, $P_i = Hash_2(P_{i-1}, R_i)$ is calculated using both a hash value $P_{i-1}$, included in the header of a previous i−1-th video stream, and an arbitrary random number $R_i$. Next, $N_i = Hash_3(P_{i+1}, R_i)$ is calculated using both a hash value $P_{i+1}$ to be included in the header of a subsequent video stream and an arbitrary random number $R_i$. In this case, if the video stream to be transmitted is the first video stream, there is no previous video stream, and thus 'seed' is used for $P_0$. Further, if the video stream to be transmitted is the last video stream, there is no subsequent video stream, and thus $N_i$ is not calculated.

The header management unit 150 manages metadata about each frame (for example, a base frame and an enhancement frame). In this case, the metadata included in the header includes frame information (for example, encoding-related information, resolution, frame rate, bit rate, etc.), a hash value for an encrypted frame, an arbitrary random number, a hash value included in the header of a previous video stream, a hash value included in the header of a subsequent video frame, etc.

The authentication information creation unit 160 performs authentication on the header, including frame information and hash values. In this case, the authentication information indicates a digital signature or a Message Authentication Code (MAC).

For example, a method of authenticating a header using the Message Authentication Code (MAC) is described. In this case, when there are two groups A and B, exchanging a message (for example, a header) with each other, groups A and B are each assumed to have a private key K.

First, group A creates a Manipulation Detection Code (MDC) using a method of inputting the private key K to a hash function with the private key K attached before the header (that is, H(K∥header)), and transmits both the created MDC and the header to group B, where H denotes the hash function and K is the private key. The MDC may also be created using a method of attaching the private key after the header, or a method of attaching the private key before and after the header.

Next, group B creates a new MDC using the received header and its own private key K, and compares the created MDC with the received MDC, thus checking the integrity of the header. If the MDCs are found to be identical to each other as a result of the checking, it can be determined that the content of the header, received from group A, has not been forged, and that the received header has been correctly transmitted from group A.

Further, the authentication information creation unit 160 collects a plurality of video streams in a buffer having a predetermined size and creates authentication information about only a single video stream, without creating authentication information about each video stream. An example of a method of collecting video streams in a predetermined buffer and creating authentication information will be described with reference to FIG. 5.

The transmission unit 170 transmits the encrypted frames, the header and authentication information about the header (for example, a digital signature or a hash value (MDC)) to the transcoder 200.

Figure 3:
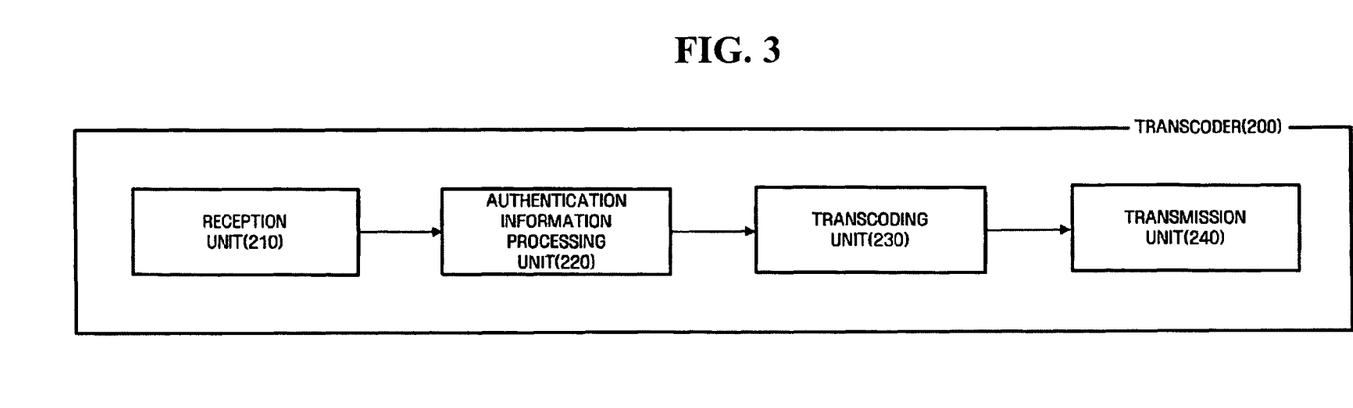
FIG. 3 is a block diagram of a transcoder in the system for providing a video stream having integrity according to an exemplary embodiment of the present invention.

FIG. 3 is a block diagram of the transcoder in the system for providing a video stream having integrity according to an exemplary embodiment of the present invention.

As shown in FIG. 3, the transcoder 200 includes a reception unit 210, an authentication information processing unit 220, a transcoding unit 230, and a transmission unit 240.

The reception unit 210 receives the encrypted frames, the header and the authentication information about the header (for example, a digital signature or an MDC), which have been transmitted from the source device 100.

The authentication information processing unit 220 determines whether the received header has been forged using the authentication information about the header, which is received through the reception unit 210. Such authentication information is a digital signature or an MAC.

For example, if the received authentication information is a digital signature, the authentication information processing unit 220 decodes the digital signature using a public key stored in the header, thus determining that the person claimed to be signer made the corresponding digital signature, and that created content was not counterfeited or forged during a transmission procedure.

The transcoding unit 230 transcodes the encrypted frames on the basis of information about the header if the integrity of the header has been verified as a result of the determination by the authentication information processing unit 220 (that is, if the header has not been forged). In this case, transcoding is performed based on truncation information of the frame information included in the header. The number of frames to be truncated can vary according to the status of a network.

The transmission unit 240 transmits the transcoded frames, the header, and the authentication information about the header (for example, a digital signature or a hash value (MDC)) to the sink device 300.

Figure 4:
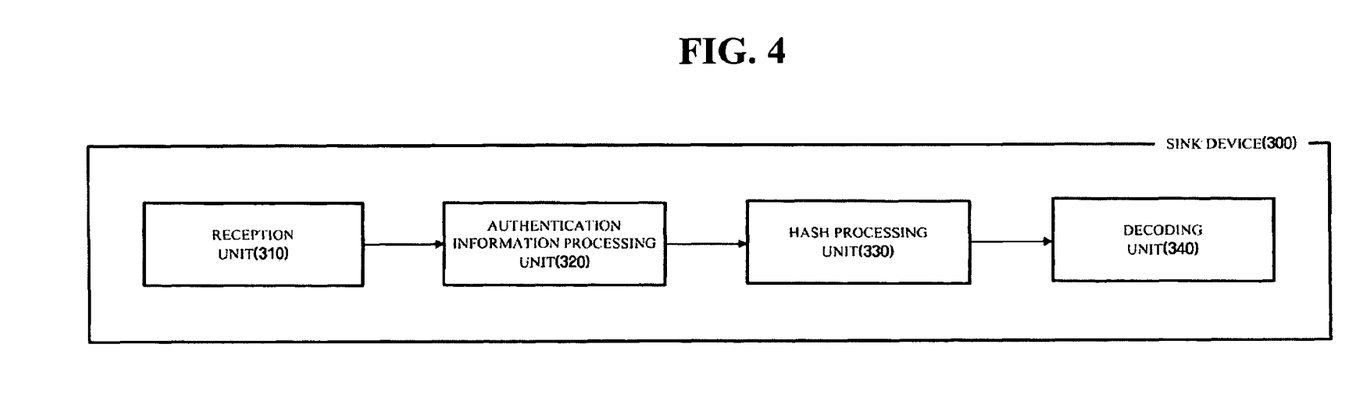
FIG. 4 is a block diagram of a sink device in the system for providing a video stream having integrity according to an exemplary embodiment of the present invention.

FIG. 4 is a block diagram of the sink device in the system for providing a video stream having integrity according to an exemplary embodiment of the present invention.

As shown in FIG. 4, the sink device 300 includes a reception unit 310, an authentication information processing unit 320, a hash processing unit 230, and a decoding unit 340.

The reception unit 310 receives the transcoded frames, the header, and the authentication information about the header (for example, a digital signature or a hash value (MDC)), which have been transmitted from the transcoder 200. In this case, the received transcoded frames may include only a base frame, or may include a base frame and one or more enhancement frames.

The authentication information processing unit 320 determines whether the received header has been forged, using the authentication information about the header, received through the reception unit 310. In this case, the authentication information indicates a digital signature or an MAC.

For example, if the received authentication information indicates a digital signature, the authentication information processing unit 320 decodes the digital signature using a public key stored in the header, thus determining that the person claimed to be the signer made the corresponding digital signature, and that created content (that is, header) was not counterfeited or forged during the transmission procedure.

If the received authentication information indicates a message authentication code, the authentication information processing unit 320 creates a new MDC using the received header and its own private key, and compares the created MDC with the received MDC, thus checking the integrity of the header. Accordingly, whether the header is counterfeited or forged can be determined.

If the integrity of the header has been verified by the authentication information processing unit 320, the hash processing unit 330 examines whether the frames have been counterfeited or forged on the basis of hash values included in the header.

For example, the hash processing unit 330 calculates hash values for the frames using the same hash function as that of the source device 100, compares the hash value included in the header with the calculated hash value, and thus examines whether the frames have been counterfeited or forged.

The decoding unit 340 decodes the received frames if neither the header nor the frames are found to have been counterfeited or forged as a result of the examination by the authentication information processing unit 320 and the hash processing unit 330.

Figure 5:
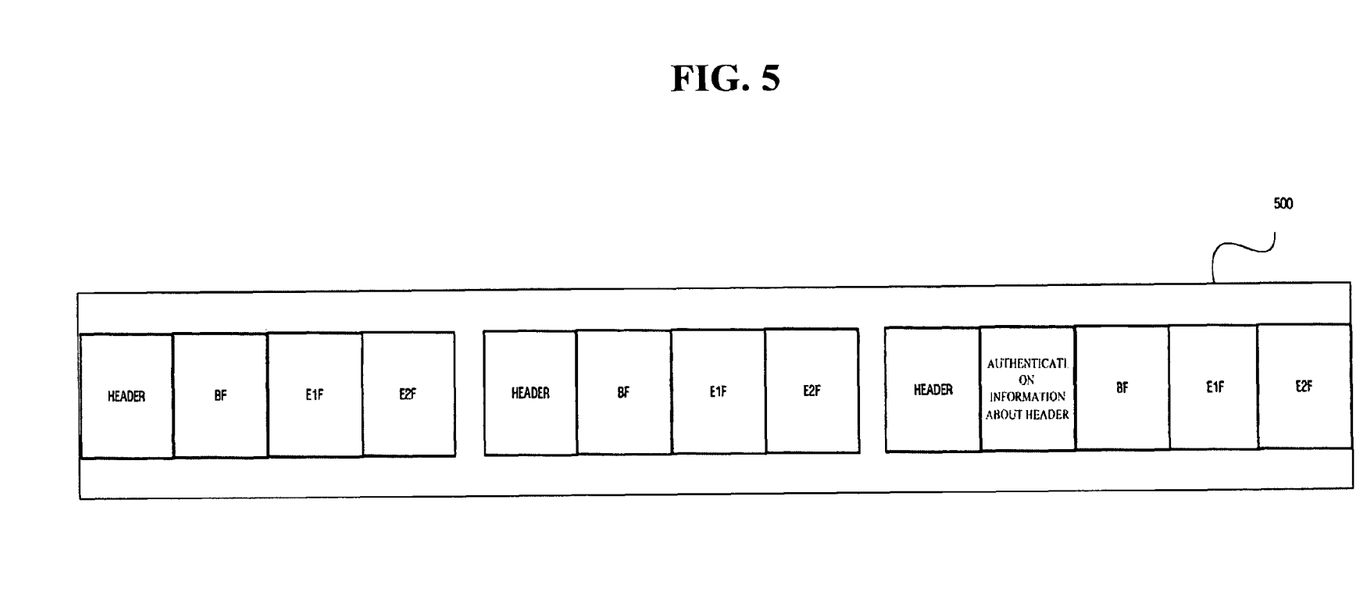
FIG. 5 is a diagram showing an example in which a piece of authentication information is included in video streams, collected in a buffer, in the system for providing a video stream having integrity according to an exemplary embodiment of the present invention.

FIG. 5 is a diagram showing an example in which a piece of authentication information is included in video streams collected in a buffer in the system for providing a video stream having integrity according to an exemplary embodiment of the present invention.

As shown in FIG. 5, a plurality of video streams is collected in a buffer 500 having a predetermined size, and authentication information about the header of a single video stream is provided. In this example, authentication information about the header of the last video stream is included in the last video stream. The reason for this is that, if authentication information about the headers of respective video streams is included, the calculation costs required to calculate the authentication information (for example, calculation costs required to calculate digital signatures or message authentication codes) are increased, so that authentication information about a header is included on the basis of the size of the buffer 500.

Therefore, since a plurality of video streams is collected to be suitable for the size of the buffer 500, and authentication information about the header of a specific video stream is included in the video stream, calculation costs required to calculate authentication information can be reduced, compared to a method of inserting a plurality of pieces of authentication information into video streams.

Figure 6:
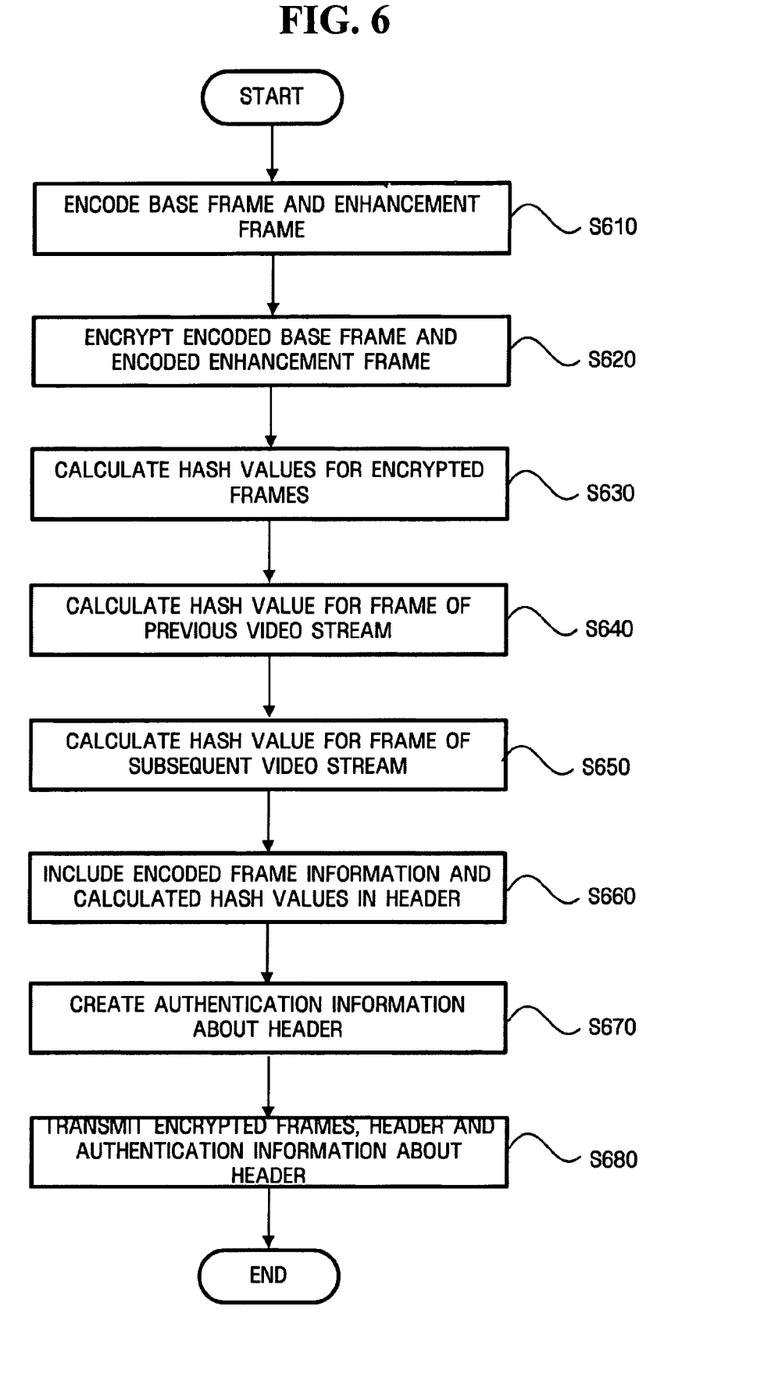
FIG. 6 is a flowchart of a process of a source device calculating hash value for frames and creating authentication information about a header in the method of providing a video stream having integrity according to an exemplary embodiment of the present invention.

FIG. 6 is a flowchart of a process of the source device calculating hash values for frames and creating authentication information about a header in a method of providing a video stream having integrity according to an exemplary embodiment of the present invention.

First, the base frame encoding unit 110 of the source device 100 encodes a base frame, and the enhancement frame encoding unit 120 encodes an enhancement frame (S610). In this case, both the base frame encoding unit 110 and the enhancement frame encoding unit 120 perform encoding on the frames using a scalable coding technique.

Next, the frame encryption unit 130 encrypts the encoded base frame and the encoded enhancement frame (S620). In this case, the frame encryption unit 130 performs encryption for respective layers using progressive encryption.

Next, the hash processing unit 140 calculates hash values for the encrypted base frame and the encrypted enhancement frame using a hash function $Hash_1(\ )$ (S630). The hash processing unit 140 calculates a hash value $P_i = Hash_2(P_{i-1}, R_i)$ using the hash value $P_{i-1}$, included in the header of a previous video stream and an arbitrary random number $R_i$, and a hash value $N_i = Hash_3(P_{i+1}, R_i)$ using the hash value $P_{i+1}$ to be included in the header of a subsequent video stream and an arbitrary random number $R_i$ (S640 and S650). In this case, the reason for calculating $P_i = Hash_2(P_{1-1}, R_i)$ and $N_i = Hash_3(P_{i+1}, R_i)$ is to check the correlation between a current video stream and previous and subsequent video streams.

Next, the header management unit 150 includes information about the encoded frames (for example, information related to encoding, resolution, frame rate, bit rate, etc.), the calculated hash values for the encrypted frames, the hash value included in the previous header ($Hash_2$), and the hash value included in the subsequent header ($Hash_3$), in the header (S660). Further, an arbitrary random number $R_i$, and a public key in the case where authentication information indicates a digital signature, are included in the header.

Next, the authentication information creation unit 160 creates authentication information about the header (S670). In this case, the authentication information indicates a digital signature or a Message Authentication Code (MAC).

In this way, the authentication information about the header is created, so that the video stream is composed of the header, the authentication information about the header, and encrypted frames (for example, a base frame and an enhancement frame).

Next, the transmission unit 170 transmits the encrypted frames, the header and the authentication information about the header to the transcoder 200 (S680).

Therefore, the integrity of the header of a video stream can be guaranteed by inserting the authentication information about the header into the video stream, and the integrity of the frames can be guaranteed by including the hash values for the frames in the header.

Figure 7:
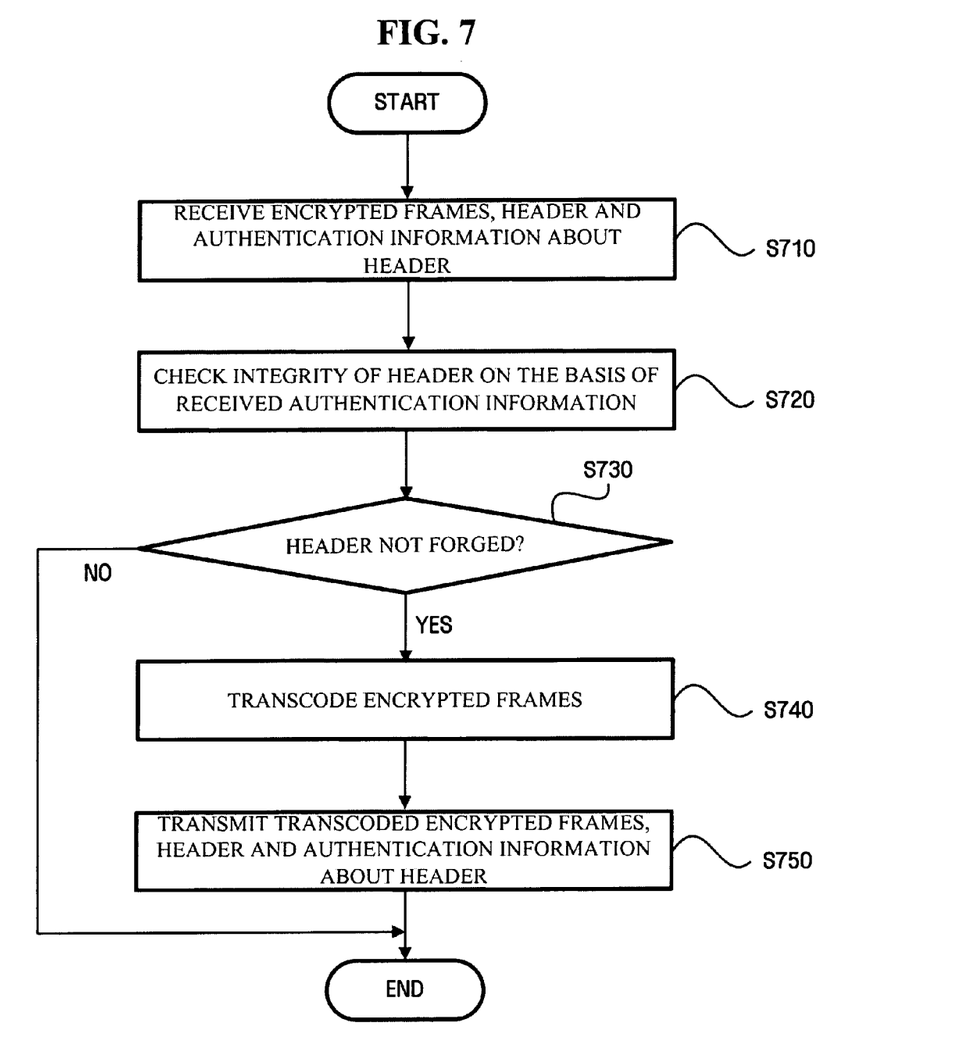
FIG. 7 is a flowchart of a process of a transcoder checking the integrity of a header and transcoding frames in the method of providing a video stream having integrity according to an exemplary embodiment of the present invention.

FIG. 7 is a flowchart of a process of the transcoder checking the integrity of a header and transcoding frames in the method of providing a video stream having integrity according to an exemplary embodiment of the present invention.

First, the reception unit 210 of the transcoder 200 receives the encrypted frames, the header and the authentication information about the header, which have been transmitted from the transmission unit 170 of the source device 100 (S710).

Next, the authentication information processing unit 220 checks the integrity of the header on the basis of the received authentication information about the header (S720).

For example, when the received authentication information indicates a digital signature, the integrity of the header can be checked by decoding the digital signature using a public key included in the header. If the digital signature is not decoded using the received public key, the content of the header can be seen to have been counterfeited or forged.

If the header is found not to have been forged (S730), the transcoding unit 230 transcodes the encrypted frames on the basis of information included in the header (S740). Next, the transmission unit 240 transmits the transcoded frames, the header and the authentication information about the header to the sink device 300 (S750).

On the other hand, if the content of the header is found to have been forged (S730), the transcoding unit 230 does not transcode the encrypted frames.

Therefore, the authentication information about the header is inserted into the video stream, thus the transcoder 200 can check the integrity of the header.

Figure 8:
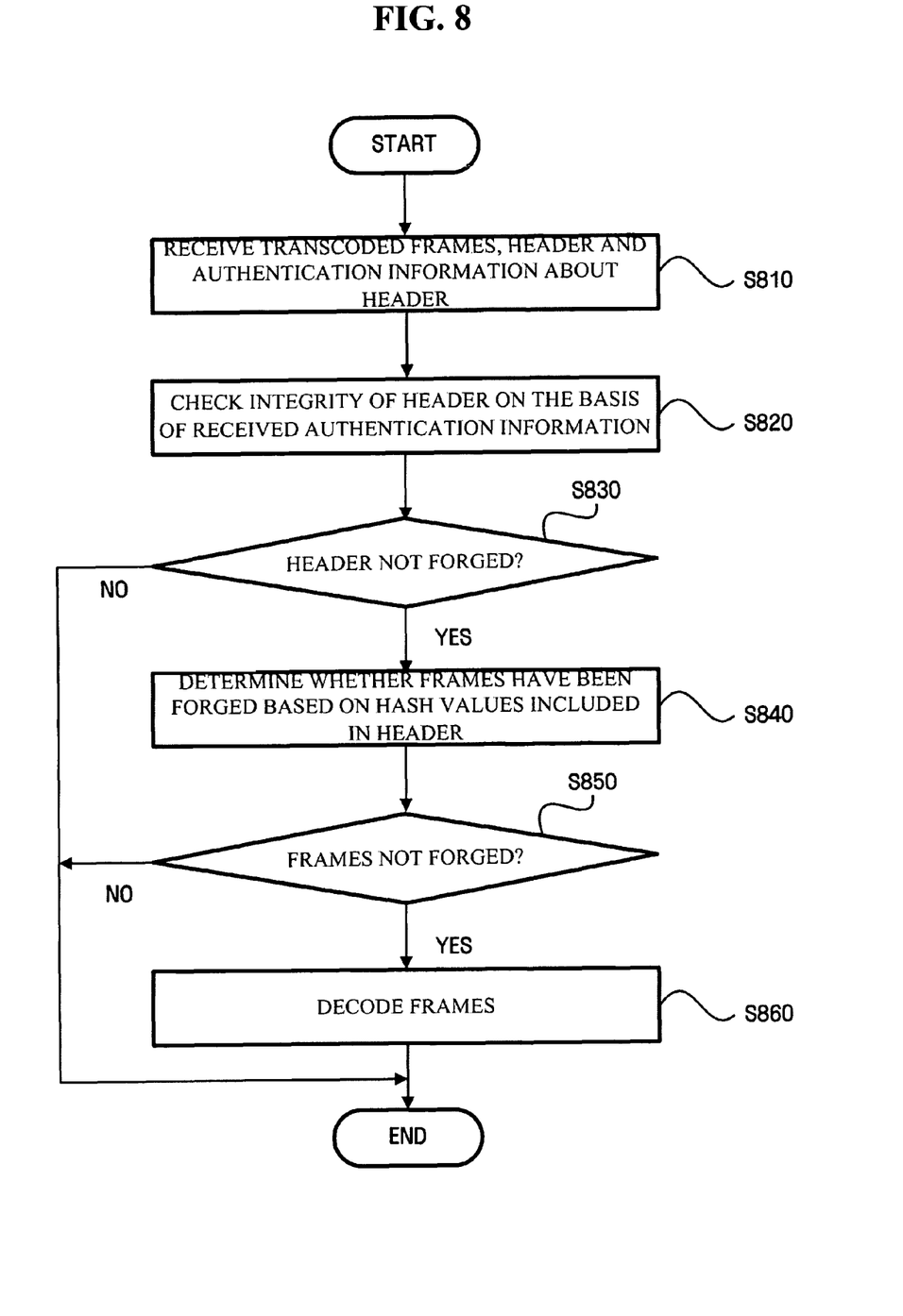
FIG. 8 is a flowchart of a process of a sink device checking the integrity of a header and frames in the method of providing a video stream having integrity according to an exemplary embodiment of the present invention.

FIG. 8 is a flowchart of a process of the sink device checking the integrity of a header and frames in the method of providing a video stream having integrity according to an exemplary embodiment of the present invention.

First, the reception unit of the sink device 200 receives the transcoded frames, the header and the authentication information about the header, which have been transmitted from the transmission unit 240 of the transcoder 200 (S810).

Next, the authentication information processing unit 320 checks the integrity of the header on the basis of the received authentication information (S820).

For example, if the received authentication information indicates a digital signature, the integrity of the header can be checked by decoding the digital signature using a public key included in the header. Further, if the received authentication information indicates a message authentication code, the authentication information processing unit 320 creates a new MDC using the received header and its own private key K, compares the created MDC with the received MDC, and thus checks the integrity of the header.

If the header is found not to have been forged as a result of the checking (S830), the hash processing unit 330 determines whether the frames have been forged, based on the hash values included in the header (S840).

For example, the authentication information processing unit 320 calculates hash values for the frames using the same hash function as that of the source device 100, and compares the hash values included in the header with the calculated hash values, thus determining whether the frames have been forged.

Next, if the frames are found not to have been forged (S850), the decoding unit 340 decodes the received frames (S860).

In contrast, if the frames are found to have been forged (S850), the decoding unit 340 does not decode the received frames. Further, if the content of the header is found to have been forged as a result of the checking (S830), the procedure for decoding the received frames is not performed.

Therefore, the integrity of the header of a video stream can be determined by inserting the authentication information about the header into the video stream, and the integrity of the frames can be determined by including hash values for the frames in the header.

As described above, the present invention provides a device and method for providing a video stream having integrity, which have the following one or more advantages.

The present invention is advantageous in that a hash value for an encrypted frame and hash values for providing correlations between the encrypted frame and previous and subsequent frames are included in the header of a video stream, thus guaranteeing and determining the integrity of the frame.

Further, the present invention is advantageous in that hash values included in the headers of previous and subsequent video streams are calculated and are included in the header, so that the correlations between video frames are provided, thus determining whether there is any deleted video stream.

Further, the present invention is advantageous in that authentication information about the header of a video stream is inserted into the video stream, thus guaranteeing and determining the integrity of information included in the header.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for providing a video stream, the device comprising:
a base frame encoding unit which encodes a base frame;
an enhancement frame encoding unit which encodes an enhancement frame;
a frame encryption unit which encrypts the encoded base frame and the encoded enhancement frame;
a hash processing unit which calculates hash values for the encrypted base frame and the encrypted enhancement frame and hash values included in headers of previous and subsequent video streams;
a header management unit including information about the encoded base frame and the encoded enhancement frame and the calculated hash values, in a header, and manages the header; and
an authentication information creation unit which creates authentication information about the header,
wherein the base frame encoding unit is implemented as hardware.

2. The device of claim 1, wherein the authentication information about the header comprises one of a digital signature and a message authentication code.

3. The device of claim 1, wherein the base frame and the enhancement frame are encoded using scalable coding.

4. The device of claim 1, wherein the authentication information creation unit collects a plurality of video streams corresponding to a buffer size, and then creates authentication information about a header of a specific video stream among the plurality of video streams.

5. The device of claim 1, further comprising a transmission unit which transmits a video stream into which the authentication information about the header is inserted.

6. A device for providing a video stream, the device comprising:
a reception unit which receives at least one encrypted frame, a header and authentication information about the header, which have been transmitted from a source device;
an authentication information processing unit which checks an integrity of the received header using the received authentication information about the header;
a transcoding unit which transcodes the encrypted frame based on information included in the header if the integrity of the header has been verified as a result of the checking, and a hash processing unit which calculates hash values for an encrypted base frame and an encrypted enhancement frame and hash values included in headers of previous and subsequent video streams;
wherein the reception unit is implemented as hardware.

7. The device of claim 6, wherein the authentication information about the header comprises one of a digital signature and a message authentication code.

8. A device for providing a video stream, the device comprising:
a reception unit which receives at least one transcoded frame, a header and authentication information about the header, which have been transmitted from a transcoder;
an authentication information processing unit which checks integrity of the received header;
a hash processing unit which determines whether the received frame has been forged based on hash values for an encrypted base frame and an encrypted enhancement frame included in the header and hash values included in headers of previous and subsequent video streams if the integrity of the header has been verified by the authentication information processing unit; and a decoding unit which decodes the received frame if the frame is determined not to have been forged by the hash processing unit,
wherein the reception unit is implemented as hardware.

9. The device of claim 8, wherein the authentication information about the header comprises one of a digital signature and a message authentication code.

10. A method of providing a video stream, the method comprising:
encoding a base frame and an enhancement frame;
encrypting the encoded base frame and the encoded enhancement frame;
calculating hash values for the encrypted base frame and the encrypted enhancement frame, and hash values included in headers of previous and subsequent video streams;
including information about the encoded base frame and the encoded enhancement frame, and the calculated hash values, in a header; and
creating authentication information about the header.

11. The method of claim 10, wherein the authentication information about the header comprises one of a digital signature and a message authentication code.

12. The method of claim 10, wherein the frames are encoded using scalable coding.

13. The method of claim 10, wherein the creating the authentication information about the header comprises collecting a plurality of video streams corresponding to a buffer size, and creating authentication information about a header of a specific video stream among the plurality of video streams.

14. A method of providing a video stream, the method comprising:
receiving at least one encrypted frame, a header and authentication information about the header, which have been transmitted from a source device;
checking an integrity of the received header using the received authentication information about the header by calculating hash values for an encrypted base frame and an encrypted enhancement frame and hash values included in headers of previous and subsequent video streams;
and transcoding the encrypted frame based on information included in the header if the integrity of the header has been verified as a result of the checking.

15. The method of claim 14, wherein the authentication information about the header comprises one of a digital signature and a message authentication code.

16. A method of providing a video stream, the method comprising:
receiving at least one transcoded frame, a header and authentication information about the header, which have been transmitted from a transcoder;
checking integrity of the received header using the received authentication information about the header;
determine whether the received frame has been forged based on hash values for an encrypted base frame and an encrypted enhancement frame included in the header and hash values included in headers of previous and subsequent video streams if the integrity of the header has been verified as a result of the checking; and decoding the received frame if it is determined that the frame has not been forged as a result of the examination.

17. The method of claim 16, wherein the authentication information about the header comprises one of a digital signature and a message authentication code.

18. The device of claim 1, wherein a random number is included in the header to calculate the hash values for frames of the previous and subsequent video streams.

19. The method of claim 10, wherein a random number is included in the headers to calculate the hash values for frames of the previous and subsequent video streams.

* * * * *